(12) United States Patent
Heine et al.

(10) Patent No.: US 10,962,284 B2
(45) Date of Patent: Mar. 30, 2021

(54) SYSTEMS AND METHODS OF DRYING BIOMASS USING RADIO FREQUENCY ENERGY

(71) Applicant: DryMAX DDG LLC, Eden Prairie, MN (US)

(72) Inventors: James Carl Heine, Dassel, MN (US); Kevin Lee Eichhorn, Chanhassen, MN (US)

(73) Assignee: DryMAX DDG LLC, Eden Prairie, MN (US)

( * ) Notice: Subject to any disclaimer, the term of this patent is extended or adjusted under 35 U.S.C. 154(b) by 0 days.

(21) Appl. No.: 16/214,995

(22) Filed: Dec. 10, 2018

(65) Prior Publication Data
US 2019/0178575 A1 Jun. 13, 2019

Related U.S. Application Data

(60) Provisional application No. 62/598,216, filed on Dec. 13, 2017, provisional application No. 62/688,776, filed on Jun. 22, 2018.

(51) Int. Cl.
*F26B 3/347* (2006.01)
*A23B 9/08* (2006.01)
*F26B 17/12* (2006.01)

(52) U.S. Cl.
CPC ............... *F26B 3/347* (2013.01); *A23B 9/08* (2013.01); *F26B 17/124* (2013.01); *F26B 2200/06* (2013.01)

(58) Field of Classification Search
CPC .... F26B 3/347; F26B 17/124; F26B 2200/06; A23B 9/08

USPC ................................................ 34/255
See application file for complete search history.

(56) References Cited

U.S. PATENT DOCUMENTS

| | | | | |
|---|---|---|---|---|
| 1,715,830 A | * | 6/1929 | Glinka | F26B 17/124 34/499 |
| 4,771,156 A | * | 9/1988 | Strattan | H05B 6/6458 219/757 |
| 5,103,575 A | * | 4/1992 | Yokoo | F26B 3/347 34/255 |
| 5,335,425 A | * | 8/1994 | Tomizawa | F26B 3/347 34/265 |
| 5,868,940 A | * | 2/1999 | Gurfinkel | B01D 35/06 106/723 |
| 6,098,306 A | * | 8/2000 | Ramsey | F26B 3/347 134/30 |
| 9,810,480 B2 | * | 11/2017 | Sears | F26B 17/12 |
| 9,879,908 B2 | * | 1/2018 | Triglia, Jr. | F26B 15/18 |
| 2005/0274035 A1 | * | 12/2005 | Beal | F26B 1/005 34/63 |

(Continued)

FOREIGN PATENT DOCUMENTS

WO WO-2017049418 A1 * 3/2017 ............. F26B 11/04

*Primary Examiner* — Stephen M Gravini
(74) *Attorney, Agent, or Firm* — Patterson Thuente Pedersen, P.A.

(57) ABSTRACT

Systems and methods of grain drying using radio frequency waves while maintaining low temperature are disclosed herein. The method and systems described herein use radio frequency waves to dry harvest crops at low temperatures. Specifically, the system and method includes minimizing temperature increases caused by dielectric radio frequency heating while increasing intermolecular hydrogen bond disruption.

2 Claims, 4 Drawing Sheets

(56) References Cited

U.S. PATENT DOCUMENTS

| | | | |
|---|---|---|---|
| 2008/0302787 A1* | 12/2008 | Erskine | F26B 3/30 |
| | | | 219/679 |
| 2010/0115785 A1* | 5/2010 | Ben-Shmuel | D06F 58/266 |
| | | | 34/260 |
| 2018/0168203 A1* | 6/2018 | Wicherski | A23B 9/08 |
| 2019/0178575 A1* | 6/2019 | Heine | F26B 3/347 |

* cited by examiner

SYSTEMS AND METHODS OF DRYING BIOMASS USING RADIO FREQUENCY ENERGY

RELATED APPLICATIONS

The present application claims the benefit of U.S. Provisional Application No. 62/598,216 filed Dec. 13, 2017 and U.S. Provisional Application No. 62/688,776 filed Jun. 22, 2018, each of which is hereby incorporated herein in its entirety by reference.

TECHNICAL FIELD

The present invention relates to drying solid materials, and more particularly, drying biomass in grain bins using radio frequency electromagnetic waves.

BACKGROUND

Agricultural harvest crops, such as corn and grain, require drying after harvest to prevent molding and other bacteria growth, spontaneous internal combustion, and other spoilage. The simplest method of drying is spread-type air drying where the harvested crop is spread out over a large area and air dried. Spread-type air drying uses the small amount of energy but impractical for even most harvest due to space and time constraints. An improved method of drying harvest crops is heat assisted air drying. Heat assisted air drying is prevalent in much of today's commercial and smaller scale agricultural harvest crop production.

In conventional heat assisted air drying, the harvest crops are loaded into drying bins that force heated air through the harvest crop until the harvest crop is at a required moisture level. To perform conventional heat assisted air drying, heat must be provided by either hydrocarbon fuel sources or electrical heating sources. Heat assisted drying of harvest crops has numerous drawbacks, however. Two of the most prevalent drawbacks are high energy costs and heat damage to the harvest crops.

Among the drawbacks of heat assisted drying is that it consumes large amounts of energy. The energy consumption of heat assisted drying in commercial agriculture, and even small scale agriculture, creates significant costs on a microscale and especially on a macro-scale.

To address the issue of high energy consumption in heat assisted drying, the industry has looked at various types of heating methods that may lower energy consumption. One low-energy solution is to utilize radio frequency electromagnetic waves to heat the harvest crops. Radio frequency heating lowers the amount of energy consumed during heating because radio frequency electromagnetic waves induce water molecule friction within the grain or kernel of the harvest crop itself. Water molecule friction within the grain or kernel creates heat and, therefore, water evaporation. The frequencies generally used in heating can range between 3 kHz and 300 GHz. Because the heat is created from within the grain or kernel as opposed to externally applied heat that must travel from the exterior of the grain or kernel to within the kernel, there is minimal heat losses to ambient air and the drying bin apparatus. Minimizing heat losses creates higher energy efficiency within the drying process.

There is yet an additional drawback to conventional heat assisted drying and that is heat damage. Heat damage is a significant issue within the agricultural harvest crops because of its high occurrence and impact on yield. Heat damages harvest crops by breaking/cracking, discoloring, and shrinking grains or kernels of the harvest crop. While radio-frequency type heat assisted drying improves energy efficiency, heat damage is still an issue. Because conventional radio frequency type heat assisted drying utilizes the heat created by water molecule friction to evaporate the water molecules, heat damage is still an issue.

In other industries, such as aggregate excavating, a large amount of aggregate material is removed from a mine or other source and requires drying. Conventionally, aggregate is dried using hydrocarbon based heaters. This method consumes large amounts of energy at a high cost. The cost of drying aggregate using hydrocarbon-based heating is even higher when the aggregate is being mined in a remote location and drying must occur before transportation because hydrocarbon fuel costs can increase dramatically in remote areas. Because aggregate drying typically does not have low heat restrictions, as does biomass drying, hydrocarbon based heating has been heavily used in the industry with minimal development in alternative methods of drying.

SUMMARY

To address both the issues of high energy consumption and heat damage in harvest crop drying, an improved system and apparatus for drying harvest crops using radio frequency drying is disclosed. In particular, systems and methods of grain drying using radio frequency waves while maintaining low temperature is disclosed. Specifically, the use of radio frequencies falling on the lower end of heating type radio frequencies is disclosed, for example 13.56 MHz.

In one embodiment, a system and method for removing water from biomass and non-biomass material is directed to radio frequency wave propagation through targeted material. Specifically, the system and method includes minimizing temperature increases caused by dielectric radio frequency heating while increasing intermolecular hydrogen bond disruption.

In embodiments, a system for low end type radio frequency grain drying, e.g., 13.56 MHz, includes various apparatus for subjecting materials to electro-magnetic energy by using radio frequencies. The system includes a radio frequency generator capable of creating radio frequency electromagnetic waves around 13.56 MHz. Further, the system includes a receptacle for the biomass material. The receptacle can have any usable dimension. The receptacle can also be electrically conductive. The system also includes a plurality of metallic injectors. The metallic injectors are electrically coupled to the radio frequency generator through an automatic tuner. Further, the metallic injectors are in direct contact with the biomass in the receptacle. The metallic injectors can comprise copper, silver, or any other electrically conductive material. Further the metallic injectors can have titanium, iridium, or any other suitable coating. The metallic injectors can have various configurations including different numbers of metallic injectors in different orientations with respect to the receptacle.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
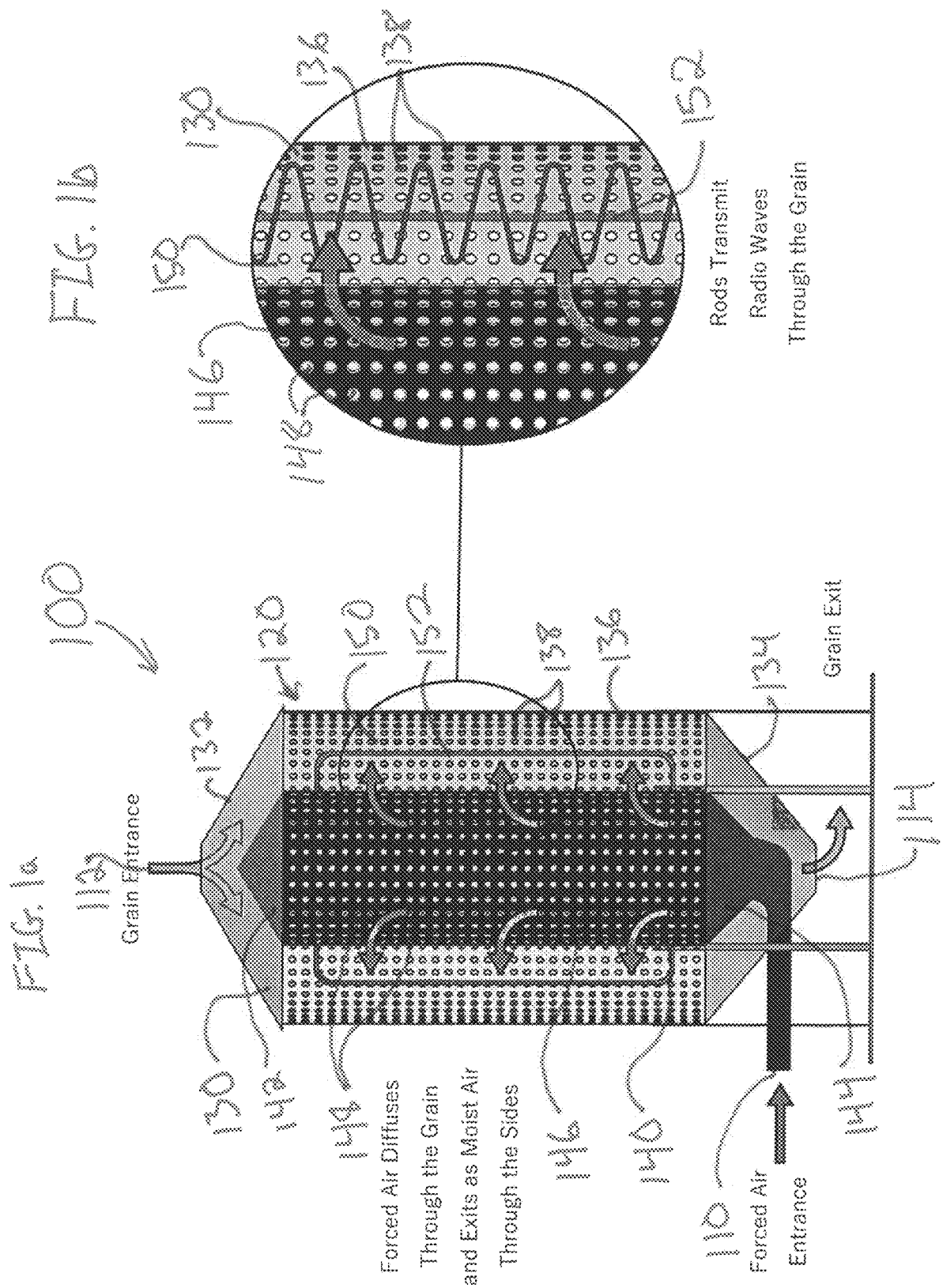
FIG. 1*a-b* is a front partially transparent view of a grain drying system, according to embodiments.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Systems and methods of grain drying using radio frequency waves while maintaining low temperature are disclosed herein. The method and systems depicted in FIGS. 1-3 serve to illustrate the use of radio frequency waves to dry harvest crops at low temperatures. Specifically, the system and method includes minimizing temperature increases caused by dielectric radio frequency heating while increasing intermolecular hydrogen bond disruption.

In one embodiment and referring to FIG. 1*a-b*, a grain drying system 100 includes an air inlet 110, a grain entrance 112, a grain exit 114, and a housing 120. In embodiments, housing 120 includes an exterior receptacle 130. Exterior receptacle 130 can include an exterior top 132, exterior bottom 134, and an exterior cylindrical face 136. Further, exterior receptacle 130 can be electrically conductive. Exterior cylindrical face 136 also can include a plurality of apertures 138 for use in air ventilation. In embodiments, housing 120 includes an interior receptacle 140. Interior receptacle 140 can include an interior top 142, interior bottom 144, and an interior cylindrical face 146. Further, interior receptacle 140 can be electrically conductive. Interior cylindrical face 146 also can include a plurality of apertures 148 for use in air ventilation. In embodiments, exterior receptacle 130 is larger than interior receptacle 140.

As depicted in FIG. 1*a*, exterior receptacle 130 and interior receptacle 140 can be arranged coaxially such that interior receptacle 140 is arranged within exterior receptacle 130. In such arrangement, a cavity 150 is created wherein the biomass or non-biomass material can be placed. Within cavity 150, a metallic injector 152 can be arranged such that it is electrically isolated from exterior receptacle 130 and interior receptacle 140, yet makes intimate contact with the biomass or non-biomass material. Further, an airflow path is created in this arrangement such that forced air can enter internal receptacle 140 via air entrance 110, then, and referring to FIG. 1*b*, can travel through apertures 148, through the biomass and non-biomass material within cavity 150, and then exit external receptacle 130 via apertures 138.

In this embodiment, radio frequency electromagnetic waves transmitted from metallic injector 152 can travel through the biomass and non-biomass in cavity 150. Further, radio frequency waves are shielded from exiting external receptacle 130 due to its metallic nature. This arrangement also serves to create a moisture sensing ability by correlating the changing impedance of the biomass to changing moisture content based on the type of biomass during a drying cycle.

For example, the complex impedance (Z) of grain drying system 100 can be modeled by the following equation:

$$|Z| = \sqrt{R^2 + \left(\omega L - \frac{1}{\omega C}\right)^2}$$

Where R is the resistance, L is the inductance, C is the capacitance, and $\omega$ is the frequency. To approximate the capacitance C of the biomass in grain drying system 100 and with respect to interior receptacle 140 and/or exterior receptacle 130, the equation for a cylindrical capacitor can be used as a basis. For example:

$$C = \frac{2\pi\varepsilon_r\varepsilon_0(\text{length})}{\ln\left(\frac{a}{b}\right)}$$

Where a is an inner radius, b is an outer radius, and length is the length of the cylinder. Further, $\varepsilon_0$ is the permittivity and $\varepsilon_r$ is the relative permittivity of the biomass. Because moisture content of the biomass affects the relative permittivity, $\varepsilon_r$, of the biomass, moisture content can be derived through active tuning of the system. Further, resistance, R, and Inductance, L, are also affected by moisture content and can therefore also be manipulated to show moisture content. For example, moisture content can be derived from tuning if the system is tuned to find the best return loss value of the electromagnetic wave power, which can be equated to a mismatch in complex impedance.

Figure 2:
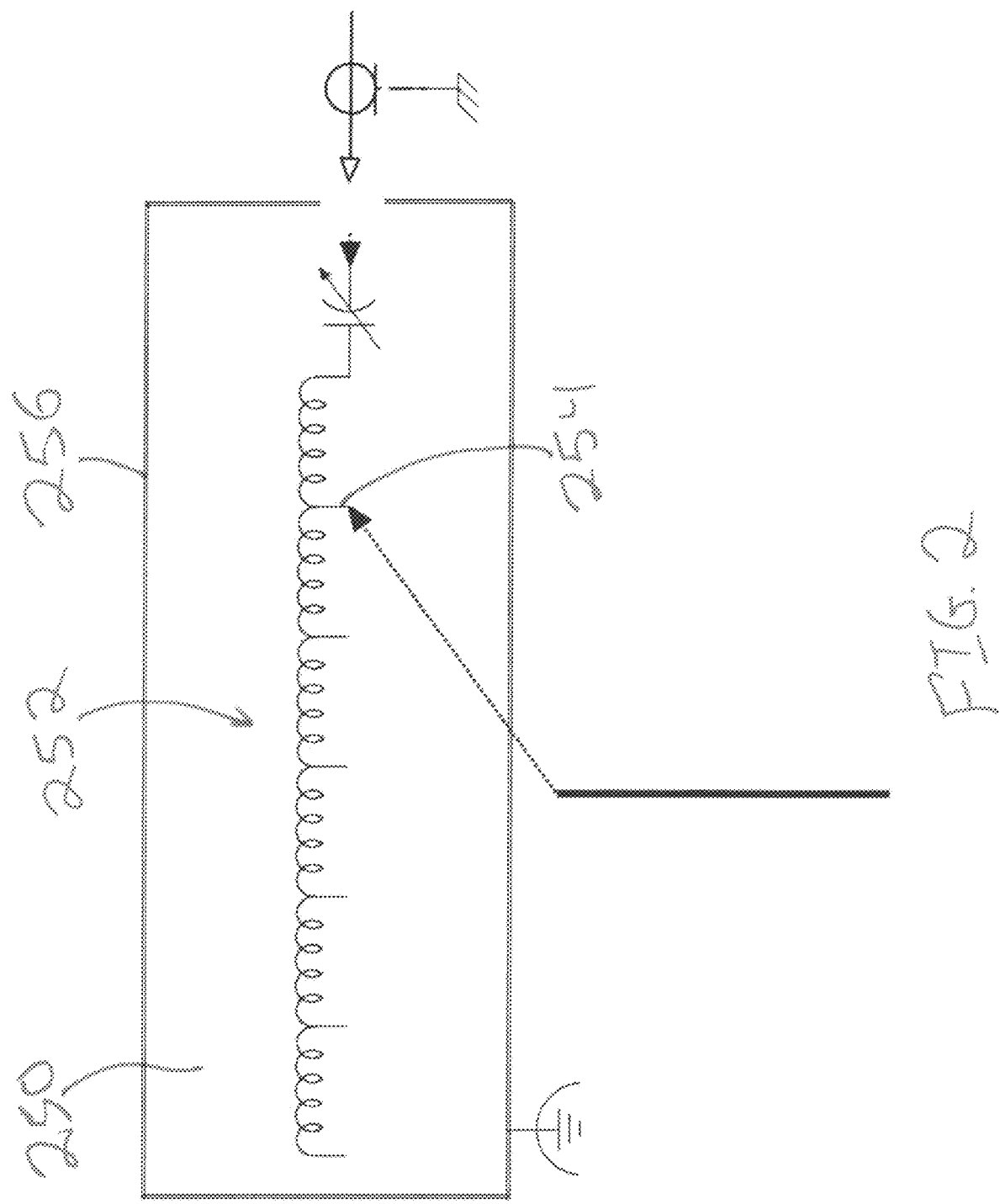
FIG. 2 is a schematic view of a metallic injector, according to embodiments.

FIG. 2 depicts a diagram of the biomass and non-biomass cavity 250 which includes a metallic injector 252. In embodiments metallic injector 252 includes the injector rod 254. Surrounding, cavity 250 is receptacle 256. In embodiments, receptacle 256 electrically models what would be exterior receptacle 130 and/or interior receptacle 140 of grain drying system 100 as previously described. Injector rod 254 serves to transmit radio frequency electromagnetic waves to its surroundings. Injector rod 254 can be made of copper, silver, or any other electrically conductive material. Further, injector rod 254 can have titanium, iridium, or any other suitable coating. The titanium, or other coating, serves to protect metallic injector 252 from corrosion and further supports surface maintenance. Receptacle 256, which is electrically grounded, acts as a Faraday shield for the system and isolates the radio frequency waves to cavity 250.

Figure 3:
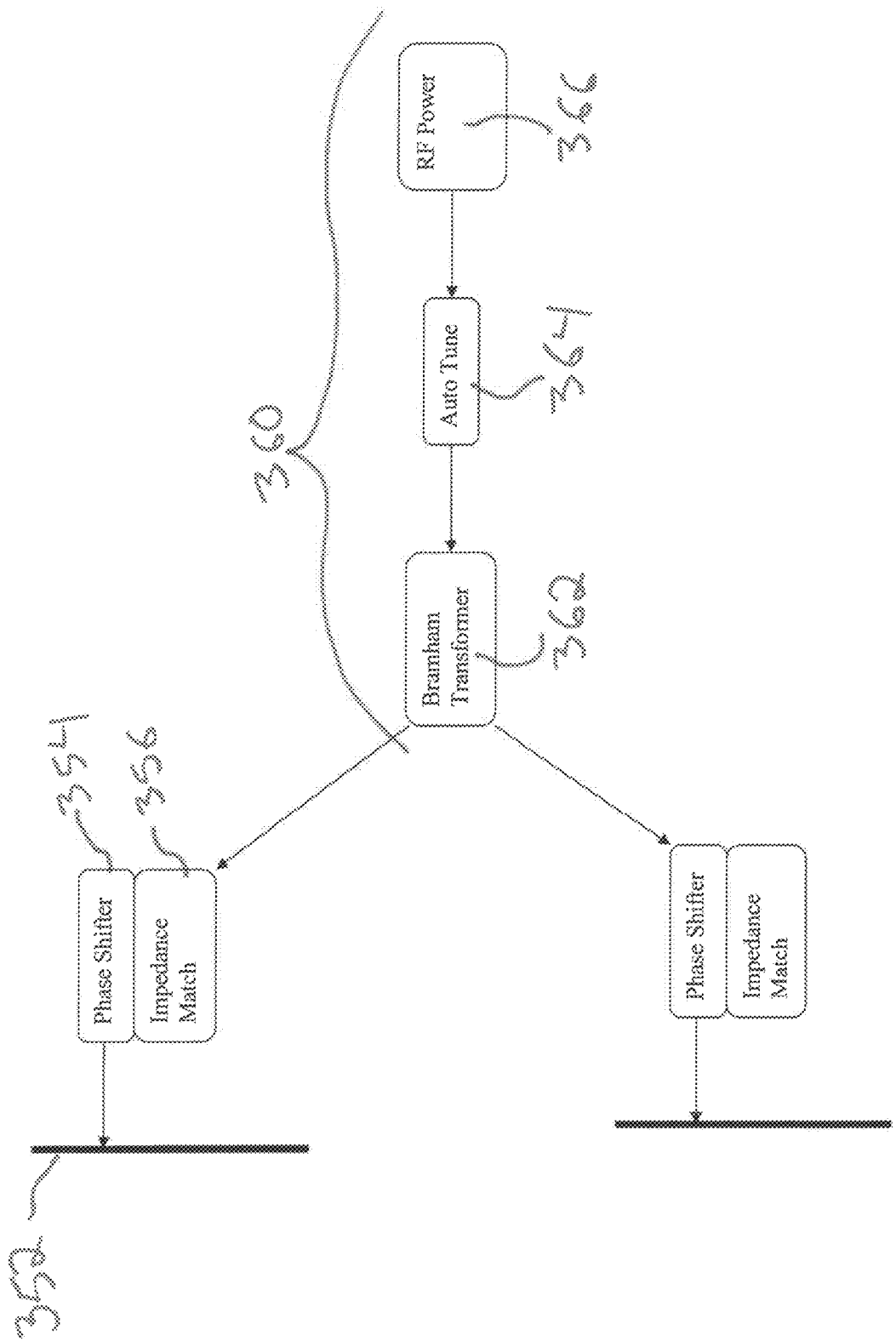
FIG. 3 is a diagram view of a radio frequency de-bonding system according to embodiments.

Referring now to FIG. 3, a diagram of a radio frequency de-bonding system 300 is depicted. Radio frequency de-bonding system 300 includes a plurality of metallic injectors 352, phase shifters 354, and impedance matchers 356. The plurality of metallic injectors 352, phase shifters 354, and impedance matchers 356 are electrically coupled to a central system 360. Central system 360 can include one or more Bramham transformers 362, auto tuner 364, and radio frequency generator 366. Auto tuner 364 is a device that can automatically maintain an impedance match between the metallic injectors 352 and the biomass that is being dried. Bramham transformers 362 can also be used to perform impedance matching functions within the system. An example of a suitable frequency generator 366 would be a phase-locked, class E, radio frequency power transmitter under the control of a microprocessor.

In embodiments, radio frequency de-bonding system 300 coupled to grain drying system 100 creates the ability to evaporate water at low temperature. Specifically, radio frequency de-bonding system 300 utilizes radio frequencies at frequencies around 13.56 MHz to bend or break the intermolecular hydrogen bonding and van der Waals dispersion interactions that are present in liquid water. This bending or breaking of the hydrogen bonds occurs as a result of being subjected to the magnetic field created by grain drying system 100.

The movement of water through a magnetic field or exposure to a varying magnetic field and its associated electromagnetic effect has been shown to disrupt intermolecular hydrogen bonding. This is because water is diamagnetic and may be polarized in magnetic fields. This polarization of water molecules physically moves and reorients the water molecules within a magnetic field. The orientation of the magnetic field is important with respect to hydrogen bond bending or breakage because any magnetic field aligned in the direction of the hydrogen bond increases the strength of the hydrogen bond whereas any magnetic field orthogonal to the direction of the hydrogen bond decreases the bond strength due to the reorientation forces that are created by the magnetic field.

Even partial alignment of the water molecules with an electric field will cause preexisting hydrogen bonding to become bent or broken thus reducing the surface tension and intermolecular bonding of water.

Thus, weak magnetic fields and stronger perpendicular magnetic fields have also been shown to increase the evaporation rate. As an added benefit, water that is exposed to constant transverse magnetic or electric fields also gives rise to a strong antimicrobial effect.

Once the intermolecular hydrogen bond is bent or broken within the grain or kernel, the new alignment of adjacent water molecules acts to repel each other effectively freeing the water molecule from intermolecular bonding. Then, with the flow of air created within to grain drying system 100, the water is removed from cavity 150.

Figure 4:
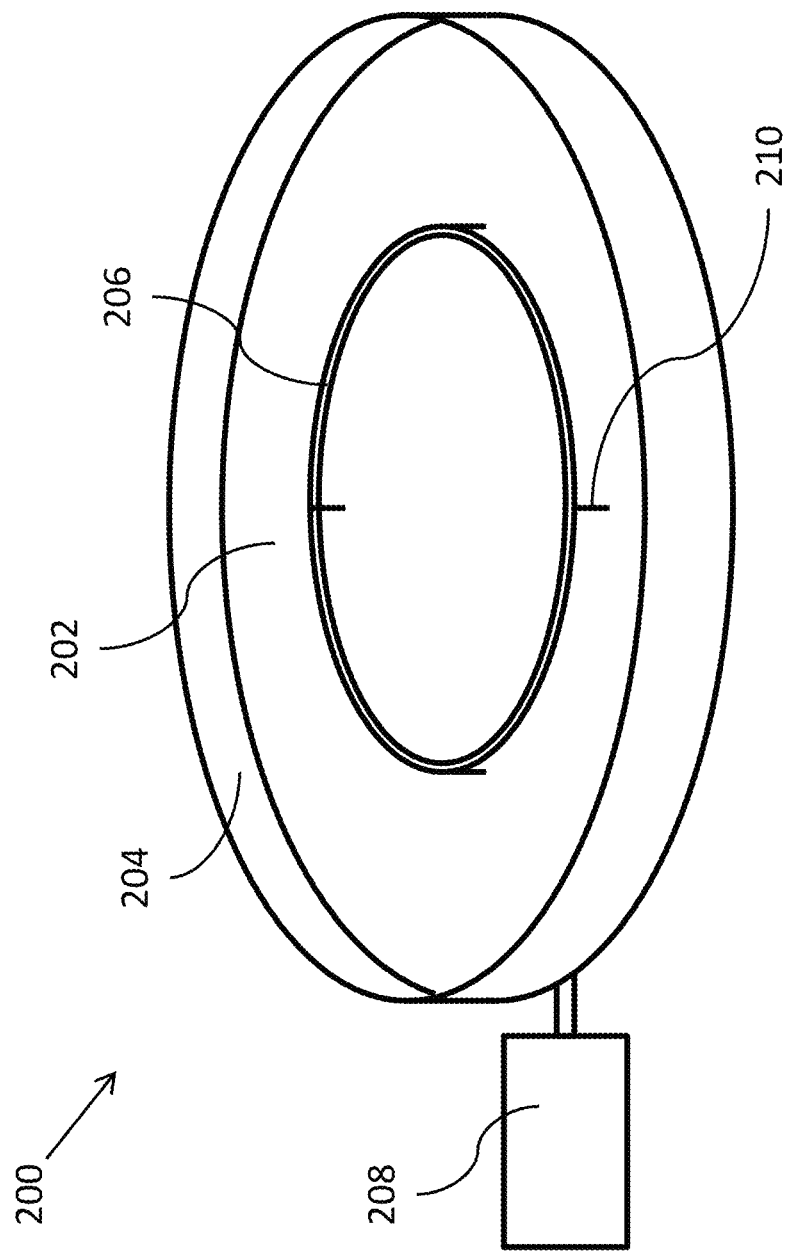
FIG. 4 is an isometric view of an alternative embodiment of a drying system, according to embodiments.

Referring now to FIG. 4 where a drying system 200 is depicted. In this embodiment, various materials can be dried using radio frequency energy emission coupled with material agitation. The various materials can include sand, biomaterials, or fertilizer precursors. In embodiments, drying system 200 includes a basin 202, retaining wall 204, radiator 206, and agitator 208. Basin 202 can be a circular disk shape or any other suitable shape. Basin 202 can be further configured to support the materials to be dried. Retaining wall 204 can be coupleable to the periphery of basin 202. Retaining wall 204 can be configured to hold the material to be dried and as such creating drying zone located above basin 202. Retaining wall 204 can also be configured to contain radio frequency emission to within the drying zone.

In embodiments, radiator 206 is coupleable to basin 202 via stands 210. In embodiments, stands 210 are configured to support radiator 206 and, at one or more stands, electrically couple radiator 206 to a radio frequency generator. To ensure proper placement of radiator 206 within a batch of material to be dried, stands 210 are configured to support radiator 206 at a height above the surface of basin 202, but below the top edge of retaining wall 204. Thus, radiator 206 is configured to be placed centrally, with respect to height, within the drying zone and to ensure that material to be dried covers radiator 206 entirely.

In embodiments, agitator 208 is coupleable to basin 202. Agitator 208 can comprise a motor having an offset weight, or in other embodiments, agitator 208 can include a plurality of magnetically controlled multiple linear actuators. Agitator 208 is configured to provide sinusoidal agitation to the material to be dried. Thus, basin 202 must be constructed to transmit the sinusoidal agitation provided by agitator 208 to the material to be dried.

In embodiments, radiofrequency energy is radiated into the material to be dried via radiator 206. In these embodiments, therefore, radiator 206 can be constructed with titanium coated beryllium/copper circular rods or with highly conductive ceramic of similar shape in order to survive the abrasive material movement such as sand. In some embodiments a plurality of radiators 206 can be included in the drying zone and coupled to basin 202. In embodiments surface area, length, shape and number of radiators 206 can be adjusted to the frequency of radiofrequency energy used as well as the volume of material to be dried.

Further in embodiments, sinusoidal agitation can be applied perpendicular to the broad face of basin 202 such that vertical motion is attained. The sinusoidal mechanical energy can be controlled by a controller and sensor system within by agitator 208 such that the lowest magnitude sinusoidal mechanical energy is used to dry the material.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A radio frequency de-bonding system for drying biomass at low temperatures, the system comprising:
   a drying cavity;
   a radio frequency injector arranged within the drying cavity;
   a radio frequency generator electrically coupled to the radio frequency injector;
   a central controller communicatively coupled to the radio frequency injector and the radio frequency generator, wherein the central controller is configured to tune an output of the radio frequency generator based on an impedance of the radio frequency injector and a sensed impedance of a quantity of biomass placed in the drying cavity.

2. A system for drying biomass using radio frequency energy, the system comprising:
   an electrically conductive exterior receptacle including an exterior receptacle wall defining a plurality of apertures, and an electrically conductive interior receptacle including an interior receptacle wall defining a plurality of apertures, wherein the interior receptacle is arranged within the exterior receptacle, thereby defining an interior air flow cavity supplied by an air inlet surrounded a drying cavity into which a quantity of biomass can be placed for drying, wherein a flow of air supplied by the air inlet flows into the interior air flow cavity through the plurality of apertures of the interior receptacle wall, into the drying cavity, and out of the electrically conductive exterior receptacle through the plurality of apertures of the exterior receptacle wall;
   a radio frequency injector arranged within the drying cavity so as to be in direct contact with the quality of biomass placed in the drying cavity, the radio frequency injector configured as one or more metallic rods constructed of at least one of a copper or silver alloy with a titanium iridium coating;
   a radio frequency generator electrically coupled to the radio frequency injector configured to generate electromagnetic waves at a frequency of about 13.5 MHz; and
   a central controller communicatively coupled to the radio frequency injector and the radio frequency generator, wherein the central controller is configured to tune an output of the radio frequency generator based on an impedance of the radio frequency injector and a sensed impedance of the quantity of biomass placed in the drying cavity,
   wherein the electrically conductive exterior receptacle and the electrically conductive interior receptacle are electrically grounded to act as a Faraday shield to at least partially isolate the electromagnetic waves emitted by the radio frequency injector to within the drying cavity.

* * * * *